United States Patent Office 2,909,460
Patented Oct. 20, 1959

2,909,460

3 - AMINO - 2,3 - DIHYDRO - 1,3 - THIAZINE - 2-THIONES AND PROCESS OF INHIBITING FUNGUS GROWTH

Van R. Gaertner, Dayton, Ohio, assignor to Monsanto Chemical Company, St. Louis, Mo., a corporation of Delaware No Drawing. Application March 21, 1957
Serial No. 647,470

9 Claims. (Cl. 167—33)

The present invention relates to heterocyclic compounds of nitrogen and more particularly provides a new class of thiazine derivatives, the method of preparing the same, fungistatic compositions comprising the new derivatives as the essential effective ingredients, and methods of inhibiting fungus growth in which said compositions are used.

According to the invention, there are prepared N-hydrocarbon-substituted - 3 - amino - 2,3 - dihydro - 6H-1,3-thiazine-2-thiones or dimers thereof by the condensation of an α,β-olefinic carbonyl compound with a salt of a 3-hydrocarbon or 3,3-dihydrocarbon-substituted dithiocarbazic acid, substantially according to the scheme:

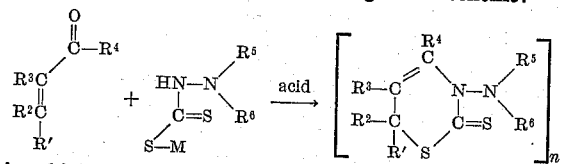

in which $R^6$ is a hydrocarbon radical free of non-benzenoid unsaturation and containing from 1 to 12 carbon atoms and $R^1$, $R^2$, $R^3$, $R^4$ and $R^5$ are selected from the class consisting of $R^6$ and hydrogen, M is alkali metal or ammonium and $n$ is a number of from 1 to 2.

Salts of 3-hydrocarbon or 3,3-dihydrocarbon-substituted dithiocarbazic acids useful for the production of the present dihydrothiazines are, e.g., the alkali metal or ammonium 3 - phenyl-dithiocarbazates, 3,3 - diphenyldithiocarbazates, 3-o-, m- or p-tolyl-dithiocarbazates, 3-α- or β-naphthyldithiocarbazates, 3-o-, m or p-xenyldithiocarbazates, 3-cyclohexyldithiocarbazates, 3-cyclopentyldithiocarbazates, 3-(4-ethylphenyl) dithiocarbazates, 3-benzyldithiocarbazates, 3-methyldithiocarbazates, 3-amyldithiocarbazates, 3-n-octyldithiocarbazates, 3-tert-dodecyldithiocarbazates, 3-methyl-3-phenyldithiocarbazates, 3-benzyl-3-phenyldithiocarbazate, 3-bis(4-butylphenyl)dithiocarbazate, 3-amyl-3-phenyldithiocarbazate, 3-(2-ethylhexyl)-dithiocarbazate, etc.

The presently useful carbonylic compounds are α,β-monoolefinic aldehydes or ketones of from 3 to 20 carbon atoms. Examples of useful aldehydes are acrolein, crotonaldehyde, methacrylaldehyde, α-ethylacrolein, α-propylacrolein, α-methyl-β-ethylacrolein, α-isobutylacrolein, 2-ethyl-2-hexenal, tiglic aldehyde, cinnamaldehyde, α-pentylcinnamaldehyde, 2-cyclohexylacrolein, etc. Examples of presently useful ketones are methyl vinyl ketone, n-propyl vinyl ketone, mesityl oxide, benzylideneacetone, crotonophenone, acrylophenone, acrylonaphthone, 3-methyl-3-buten-2-one, 5-ethyl-3-nonen-2-one, naphthyl styryl ketone, benzylacetophenone (chalcone), seneciophenone, cyclohexyl vinyl ketone, etc.

The presently useful salts of 3-hydrocarbon dithiocarbazic acids are readily available materials which are prepared by methods known in the art, e.g., by reaction of a hydrocarbon substituted hydrazine with carbon disulfide in the presence of an inorganic basic material. Alkali metal 3-phenyldithiocarbazates, for example, are obtained simply by adding carbon disulfide to phenylhydrazine in the presence of aqueous alkali metal hydroxide:

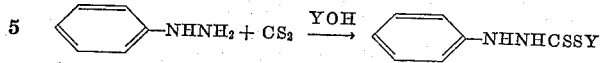

where Y is alkali metal. For reaction with the α,β-monoolefinic carbonyl compound to obtain the present thiazine compounds, the hydrocarbon dithiocarbazic acid salts need not be separated from the reaction mixture in which they have been formed. Thus, for the preparation of, say, 3-anilino-2,3-dihydro-4,6-diphenyl-6H-1,3-thiazine-2-thione, the reaction mixture obtained upon treating phenylhydrazine with carbon disulfide in the presence of aqueous alkali, and containing the alkali metal phenyldithiocarbazate, is mixed with benzalacetophenone in the presence of a mineral acid and the mixture is maintained at ordinary or moderately decreased or increased temperature until the following reaction has been completed:

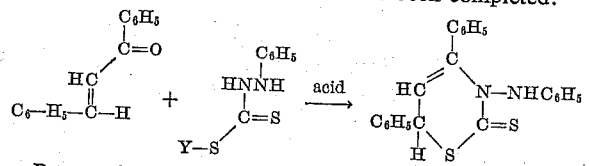

Preparation of the present dihydrothiazine compounds is believed to occur by primary acid hydrolysis of the alkali metal salt to the free 3-phenyldithiocarbazic acid, addition of the free acid to the olefinic bond of the carbonyl compound, and subsequent ring closure by elimination of water. In the absence of conclusive evidence for support of such a reaction scheme, however, this mechanism is advanced only as a possible explanation of the formation of the compound which does, in fact, take place upon contacting the present α,β-olefinic carbonyl compounds with the alkali metal 3-phenyldithiocarbazates in the presence of aqueous mineral acid.

Whether the monomeric or dimeric dihydrothiazine compound is formed depends upon the reaction conditions employed as well as upon the nature of the carbonyl component. Whereas the dihydrothiazine products obtained from the α,β-olefinic ketones are generally stable, monomeric compounds in that they always have a hydrocarbon radical attached to at least one of the olefinic carbon atoms of the dihydrothiazine, i.e., at the 4 position, those of the products which are obtainable from the α,β-olefinic aldehydes (wherein there is always a hydrogen atom attached at the 4 position) are generally dimeric, and particularly so if the other olefinic carbon atom also carries a hydrogen atom. Thus, in the reaction of acrolein with, say, potassium 3-phenyldithiocarbazate there is obtained a mixture of monomeric dihydro-6H-1,3-thiazine-2-thione:

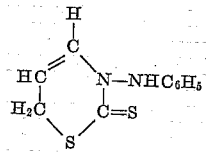

and the dimer thereof, or only the dimer thereof:

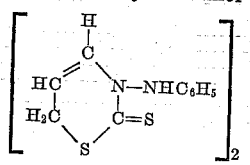

Here the propensity to polymerization is so marked, especially in the acidic medium which comprises the reaction mixture, that the product is believed to be essentially dimeric. Because the monomeric and dimeric products are separated from each other only with difficulty, and because both the monomeric N-hydrocarbon-substituted 3-amino-2,3-dihydro-6H-1,3-thiazine-2-thiones and the dimers thereof possess fungistatic activity, isolation of either monomer or dimer is of only academic interest. For practical purposes no separation of monomer from dimer is generally required.

Although, as pointed out above, the thiazine compounds which are obtained from the carbazates and α,β-olefinic ketones are generally monomeric, they may be converted to dimers by strongly acidic media and/or by heat.

In the presence of strong acids, the reaction product obtained from the dithiocarbazic acid salt and the ketone may be a mixture of monomer and dimer. For fungistatic applications, either the monomeric or dimeric ketone-derived products, or mixtures thereof may be employed.

The present invention thus provides a product selected from the class consisting of monomeric dihydrothiazine compounds of the formula

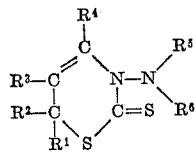

in which $R_6$ is a hydrocarbon radical free of non-benzenoid unsaturation and containing from 1 to 12 carbon atoms and $R^1$, $R^2$, $R^3$, $R^4$ and $R^5$ are selected from the class consisting of hydrogen and $R^6$, dimers of such monomeric dihydrothiazine compounds, and mixtures of said monomeric compounds with said dimers.

The following table gives examples of products provided, according to the invention, from the indicated carbonyl compound and the indicated alkali metal or ammonium 3-hydrocarbon substituted dithiocarbazate:

dihydrothiazine compound. As acidic medium there may be employed any inorganic or organic acid or acid-reacting salt thereof. Advantageously an aqueous solution of an inorganic acid such as sulfuric, hydrochloric and phosphoric acid is employed. The dihydrothiazine compound is readily recovered from the resulting reaction by neutralization, filtration to remove any precipitated salts and subsequent distillation or extraction of the filtrate.

The initially employed quantity of salt or carbonyl reactant is unimportant since either is readily recovered when employed in greater than the stoichiometrically required 1:1 molar ratio. Those of the products which are crystalline solids generally separate from the reaction mixture upon neutralization. The liquid dihydrothiazines, on the other hand, and particularly the dimers, generally require distillation and/or solvent extraction for isolation in good yields.

As herein disclosed both the present monomeric and dimeric dihydrothiazines are of particular utility as the effective ingredients of fungicidal compositions. They are also valuable as rubber additives and in the synthesis of pharmaceuticals.

The present dihydrothiazines are highly efficient for preventing and retarding fungus growth on plants, fruits, seeds, soils, fur, leather, cotton, wood and organic materials in general. They may be applied directly to the organic material which is to be treated, but because the present thiazine compounds are effective in extremely dilute concentrations, it is preferred to incorporate the present agents with a carrier or diluent.

Fungicidal dusts may be prepared by mixing the compounds with dusting materials such as talc, clay, lime, bentonite, pumice, fuller's earth, etc. The present dihydrothiazines are soluble in the usual organic solvents and may be used in solution, as fungicidal sprays. Suspensions or dispersions of the compounds in a non-solvent such as water are advantageously employed in the

| Carbonyl compound | -Dithio carbazate | -2,3-dihydro-6H-1,3-thiazine-2-thione (monomer and/or dimer) |
|---|---|---|
| Acrolein | 3-methyl | 3-(methylamino)- |
| Do | 3,3-diethyl | 3-(diethylamino)- |
| Do | 3,3-diphenyl | 3-(diphenylamino)- |
| Do | 3-p-tolyl | 3-(p-tolylamino)- |
| Do | 3-β-naphthyl | 3-(β-naphthylamino)- |
| Do | 3-phenyl | 3-anilino |
| Do | 3-(4-xenyl) | 3-(4-xenylamino)- |
| Do | 3-(cyclopentyl) | 3-(cyclopentylamino)- |
| Do | 3,3-bis(4-ethyl-phenyl) | 3-[bis(4-ethylphenyl)amino |
| Do | 3-dodecyl | 3-(dodecylamino)- |
| Crotonaldehyde | 3-phenyl | 3-anilino-6-methyl- |
| Do | 3-butyl-3-phenyl | 3-(N-butyl-N-phenylamino)-6-methyl |
| Do | 3-m-xylenyl | 3-(m-xylenylamino)-6-methyl |
| Do | 3,3-didodecyl | 3-(N,N-didodecylamino)-6-methyl |
| Do | 3-tert-octyl | 3-(tert-octylamino)-6-methyl |
| Cinnamaldehyde | 3-phenyl | 3-anilino-6-phenyl |
| Do | 3-(2-ethylhexyl) | 3-[(2-ethylhexyl)amino]-6-phenyl |
| Do | 3,3-di-p-tolyl | 3-(di-p-tolylamino)-6-phenyl |
| α-Ethylacrolein | 3-phenyl | 3-anilino-5-ethyl |
| Do | 3,3-di-n-amyl | 3-(di-n-amylamino)-5-ethyl |
| 2-Ethyl-2-hexenal | 3-phenyl | 3-anilino-6-butyl-5-ethyl |
| α-Methyl-β-ethyl-acrolein | do | 3-anilino-6-ethyl-5-methyl |
| α-Pentylcinnamaldehyde | 3-p-tolyl | 3-(p-tolylamino)-5-pentyl-6-phenyl |
| α-Isobutyl-acrolein | 3-cyclohexyl | 3-(cyclohexylamino)-5-iso-butyl |
| Mesityl oxide | 3-α-naphthyl | 3-(α-naphthylamino)-4,6,6-trimethyl |
| Do | 3-ethyl | 3-(ethylamino)-4,6,6-tri-methyl |
| Do | 3,3-diphenyl | 3-(diphenylamino)-4,6,6-tri-methyl |
| Do | 3-(4-methylcyclohexyl) | 3-(4-methylcyclohexylamino)-4,6,6-trimethyl |
| Ethylideneacetone | 3-phenyl | 3-anilino-4-methyl-6-methyl |
| Benzylideneacetone | 3-dodecyl | 3-(dodecylamino)-4-methyl-6-phenyl |
| Do | 3-phenyl | 3-anilino-4-methyl-6-phenyl |
| Do | 3,3-diethyl | 3-(diethylamino)-4-methyl-6-phenyl |
| Benzalacetophenone | 3-p-xenyl | 4,6-diphenyl-3-p-xenyl-amino |
| Do | 3-cyclohexyl | 3-(cyclohexylamino)-4,6-diphenyl |
| Do | 3,3-diphenyl | 3-(diphenylamino)-4,6-diphenyl |
| Phenyl vinyl ketone | 3-phenyl | 3-anilino-4-phenyl |
| Do | 3-(amyl-β-naphthyl) | 3-(amyl-β-naphthylamino)-4-phenyl |
| tert-Butyl styryl ketone | 3-phenyl | 3-anilino-4-butyl-6-phenyl |
| α-Naphthyl vinyl ketone | do | 3-anilino-4-α-naphthyl |

The present dihydrothiazines are easily prepared by contacting the appropriate dithiocarbazates with the appropriate α,β-olefinic carbonyl compound, in the presence of an acidic medium at ordinary or moderately increased or decreased temperatures and allowing the resulting reaction mixture to stand until formation of the treatment of plant foliage, textiles, leather and other materials with which it is not desirable to employ either a solid carrier or an organic solvent.

Fungicidal compositions comprising the present active ingredients may be applied only to the surface of the material to be treated as when treating foliage, furs, leather and other comparatively impregnable materials upon which fungus growth is to be prevented or retarded. In other cases, for example, when it is desired to protect seeds from soil microorganisms harmful to the seeds and plants, the dihydrothiazines, preferably incorporated with a solid carrier, may be mixed with the seed. For protection of fruits, seeds, plant tubers, etc. during storage, it may be advantageous to effect the treatment by employing baths comprising aqueous emulsions of the fungicides. Impregnation of textiles with the fungicides is also advantageously effected by immersion in solutions of these compounds.

The invention is further illustrated, but not limited, by the following examples:

Example 1

A solution of potassium 3-phenyldithiocarbazate was prepared as follows: A mixture of 32.4 g. (0.30 mole) of phenylhydrazine, and 16.8 g. (0.30 mole) of potassium hydroxide was dissolved, with stirring, in 170 g. of ethanol. The resulting solution was cooled to below 5° C. and maintained cold by means of an ice-salt bath while 22.8 g. (0.30 mole) of carbon disulfide was added to it dropwise during 20 minutes. The clear solution changed to a slurry within about ten minutes. It was stirred for 90 minutes at 0° C. to assure complete reaction. The resulting reaction mixture (242 g.), assumed to contain 0.30 mole of the potassium phenyldithiocarbazate, was then diluted with water to give a solution weighing a total of 519 g. It will be hereinafter referred to as solution A.

To 173 g. of the cold solution A (containing 0.10 mole of potassium phenyldithiocarbazate) there was added a solution of 5.6 g. (0.10 mole) of acrolein and 6.0 ml. concentrated hydrochloric acid in 10 ml. of water which had been cooled to 10° C. The reddish oil which separated was extracted with ether, the extract was washed with water and dilute aqueous sodium bisulfite, and then dried over sodium sulfate. Distillation of the dried material to remove solvents gave as residue 20 g. of a red viscous oil having an empirical formula of $C_{10}H_{10}N_2S_2$, probably dimeric 3-anilino-2,3-dihydro-6H-1,3-thiazine-2-thione, which analyzed 12.36% nitrogen as against 12.6, the calculated value for either the monomer or dimer.

Example 2

This example is like Example 1, except that there was used 7.0 g. (0.1 mole) of crotonaldehyde, instead of acrolein, with the 173 g. of solution A. There was thus obtained a theoretical yield of a reddish oil of the empirical formula $C_{11}H_{12}N_2S_2$, probably dimeric 3-anilino-2,3-dihydro-6-methyl-6H-1,3-thiazine-2-thione, which analyzed 11.32% nitrogen as against 11.84%, the calculated nitrogen value for either the monomer or dimer.

Example 3

Benzalacetophenone (7.2 g., 1.0 mole) was dissolved in 50 ml. of dioxane, treated with 2 ml. of concentrated hydrochloric acid, cooled to below 10° C., and then with 58 g. of the solution A of Example 1 (equivalent to 0.033 mole of potassium phenyldithiocarbazate). A voluminous solid separated out. The whole was allowed to stand overnight, diluted with water and filtered. After washing the precipitate with water it was oven-dried at 80° C. to give 12.0 g. of crude product, M.P. 148–152° C. Twice repeated solution in hot ethanol and crystallization from acetic acid gave the substantially pure 3-anilino-2,3-dihydro-4,6-diphenyl-6H-1,3-thiazine-2-thione, M.P. 155–6° C., analyzing 7.34% nitrogen as against 7.48%, the calculated nitrogen value.

Example 4

Preparation of the solution A of Example 1 was repeated except that final dilution with water was omitted. The reaction mixture here employed (242 g.) corresponded to 0.3 mole of potassium phenyldithiocarbazate. To 121 g. thereof (0.15 mole of said dithiocarbazate) there was added 100 g. of ice, and the whole was stirred until homogeneous. This was added, at a temperature of below 10° C., to a cooled solution of 14.7 g. (0.15 mole) of mesityl oxide in dilute hydrochloric acid (9.0 g. of concentrated hydrochloric acid in 15 ml. of water). After stirring at room temperature overnight, the reaction mixture was made strongly alkaline (above pH 8), diluted with water and extracted with ether. After drying over sodium sulfate, the dried extract was distilled to remove the solvents and there was obtained as residue 4.6 g. of the dark, viscous 3-anilino-4,6,6-tri-methyl-2,3-dihydro-6H-1,3-thiazine-2-thione, analyzing 25.66% sulfur as against 25.4% the calculated value for $C_{12}H_{16}N_2S_2$.

Example 5

This example shows testing of the 3-anilino-4,6,6-trimethyl-2,3-dihydro-6H-1,3-thiazine-2-thione of Example 4 against fungi.

*Spore germination test.*—In this test the fungitoxicity of a compound was determined against spores of *Stemphyllium sarcinaeforme*, the causal organism of clover leaf spot and *Monilinia fructicola*, the causal organism of brown rot of stone fruits. An aqueous suspension containing 1,000 p.p.m. of the test compound was prepared and respective 0.02 ml. aliquots thereof were pipetted into respective wells of depressed glass slides. Then an 0.1 ml. aliquot of a spore suspension of one of the test organisms was pipetted into each well. The concentration of test chemical in each well was thus 200 p.p.m. The slides were then incubated in moist chambers for 24 hours at a temperature of 25° C. Inspection of the slides at the end of that time showed no spore germination of either organism in wells containing the 200 p.p.m. concentration of the 3-anilino-4,6,6-trimethyl-2,3-dihydro-6H-1,3-thiazine-2-thione, whereas profuse germination was noted on "controls," i.e., wells containing only the spore suspension in absence of any chemical.

*Foliage eradicant wheat rust test.*—Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

One hundred milligrams of the test chemical, i.e., the dihydrothiazine-2-thione of Example 4, was added to 5 ml. of acetone, and there was then introduced to the resulting solution approximately 0.1 ml. of an emulsifying agent known to the trade as "Tween 20" and reputed to be a polyoxyethylene sorbitan monolaureate. The whole was then diluted with 5 ml. of water to give an emulsion containing 1% by weight of said test chemical. For the instant test the 1% emulsion was further diluted with water to give respective emulsions containing 0.5% and 0.25% by weight of said product.

Spraying of the plants with emulsions was effected by means of an atomizer, 5 ml. of the emulsion being used per pot of 5 plants. The sprayed plants were then returned to the greenhouse and held there for a week. Observation of the plants at the end of that time disclosed that the plants which had been sprayed with the 0.5% or the 0.25% emulsion of said test compound were entirely free of rust pustules. Similarly inoculated but unsprayed plants which had been maintained in the incubator and greenhouse for the same length of time were found to be badly affected by the rust.

*Systemic test—tomato wilt:*—Three two-week old Bonny Best tomato seedlings were immersed into water containing either 100 parts of 10 parts per million of 3 - anilino - 4,6,6 - trimethyl - 2,3 - dihydro - 6H - 1,3-thiazine - 2 - thione of Example 4. After 48 hours the seedlings were removed and the root systems were rinsed thoroughly in tap water to remove any chemical residue. Approximately ⅓ of each lateral root system of each plant was severed and the wounded roots were dipped for 30 seconds in a bud-cell suspension of *Fusarium oxysporum* f. *lycopersici*. The thus inoculated plants were then potted in 4-inch clay pots of steamed-soil. "Blanks" were prepared by similarly inoculating and potting tomato seedlings which had not been exposed to the test compound. The potted plants were then set in the greenhouse for observation.

Marked Fusarium wilt symptoms were noted on the "blanks," whereas the plants which had been treated with said test compound in either the 100 p.p.m. or 10 p.p.m. concentration appeared to be in excellent condition. At this time disease incidence in the plants which had been immersed in the 100 p.p.m. or 10 p.p.m. aqueous suspensions was investigated by cross-sectioning the stem of each of the treated and inoculated plants and examining them for vascular browning. No vascular discoloration was noted. Similar examination of the "blanks" showed pronounced browning.

*Example 6*

The acrolein-potassium 3-phenylcarbazate reaction product $C_{10}H_{10}N_2S_2$ of Example 1, the crotonaldehyde-potassium 3-phenylcarbazate reaction product $C_{11}H_{12}N_2S_2$ of Example 2, and the 3-anilino-2,3-dihydro-4,6-diphenyl-6H-1,3-thiazine-2-thione of Example 3 were tested against the organism *Monilinia fructicola* at a concentration of 200 p.p.m. and against the organism *Fusarium oxysporium* f. *lycopersici* at a concentration of 100 p.p.m., using the procedure described in Example 5. In each case excellent control of these organisms was evidenced.

What I claim is:
1. A compound of the formula

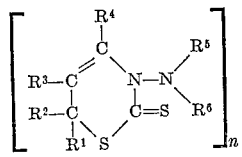

in which $R^6$ is a hydrocarbon radical free of non-benzenoid unsaturation and containing from 1 to 12 carbon atoms and $R^1$, $R^2$, $R^3$, $R^4$ and $R^5$ are selected from the class consisting of $R^6$ and hydrogen and $n$ is a number of from 1 to 2.

2. 3 - anilino - 2,3 - dihydro - 4,6 - diphenyl - 6H - 1,3-thiazine-2-thione.

3. 3 - Anilino - 4,6,6 - trimethyl - 2,3 - dihydro - 6H-1,3 - thiazine - 2 - thione.

4. The method which comprises contacting, in an acidic medium, a carbonyl compound of the formula

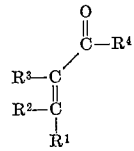

in which $R^1$, $R^2$, $R^3$ and $R^4$ are selected from the class consisting of hydrogen and hydrocarbon radicals free of non-benzenoid unsaturation and containing from 1 to 12 carbon atoms with a salt of the formula

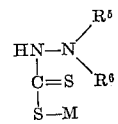

in which $R^6$ is a hydrocarbon radical free of non-benzenoid unsaturation and containing from 1 to 12 carbon atoms and $R^5$ is selected from the class consisting of $R^6$ and hydrogen and M is selected from the class consisting of alkali metal and ammonium, and recovering from the resulting reaction product a compound of the formula

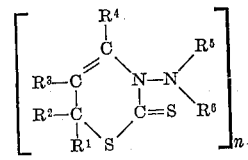

in which $R^1$, $R^2$, $R^3$, $R^4$, $R^5$, $R^6$ are as herein defined and $n$ is a number of from 1 to 2.

5. The method which comprises contacting benzalacetophenone with potassium 3-phenyldithiocarbazate in an acidic medium and recovering 3-anilino-2,3-dihydro-4,6-diphenyl-6H-1,3-thiazine-2-thione from the resulting reaction product.

6. The method which comprises contacting mesityl oxide with potassium 3-phenyldithiocarbazate in an acidic medium and recovering 3-anilino-4,6,6-trimethyl-2,3-dihydro-6H-1,3-thiazine-2-thione from the resulting reaction product.

7. The method of preventing the growth of fungi which comprises exposing the fungi to a fungitoxic quantity of a compound of the formula

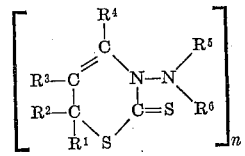

in which $R^6$ is a hydrocarbon radical free of non-benzenoid unsaturation and containing from 1 to 12 carbon atoms and $R^1$, $R^2$, $R^3$, $R^4$, and $R^5$ are selected from the class consisting of $R^6$ and hydrogen and $n$ is a number of from 1 to 2.

8. The method of inhibiting fungus growth which comprises exposing the fungi to a fungitoxic quantity of 3-anilino-2,3-dihydro-4,6-diphenyl-6H-1,3-thiazine-2-thione.

9. The method of inhibiting fungus growth which comprises exposing the fungi to a fungitoxic quantity of 3-anilino-4,6,6-trimethyl-2,3-dihydro,6H-1,3-thiazine-2-thione.

References Cited in the file of this patent

UNITED STATES PATENTS

| | | |
|---|---|---|
| 1,850,136 | Powers | Mar. 22, 1932 |
| 2,193,652 | Semon | Mar. 12, 1940 |
| 2,440,095 | Jansen | Apr. 20, 1948 |
| 2,514,004 | Mathes | July 4, 1950 |
| 2,568,633 | Jansen | Sept. 18, 1951 |
| 2,727,035 | Bowers | Dec. 13, 1955 |
| 2,783,229 | Tummes | Feb. 16, 1957 |

FOREIGN PATENTS

| | | |
|---|---|---|
| 489,259 | Canada | Dec. 30, 1952 |
| 575,114 | Germany | Apr. 24, 1933 |